UNITED STATES PATENT OFFICE 2,323,409

ETHYLENE SULPHIDE REACTION PRODUCT OF CYANAMIDE

Leonard Patrick Moore, Stamford, and Walter P. Ericks, Cos Cob, Conn., assignors to American Cyanamid Company, New York, N. Y., a corporation of Maine No Drawing. Application December 14, 1940, Serial No. 370,146

1 Claim. (Cl. 260—551)

This invention relates to the preparation of new cyanamide derivatives. More particularly it embraces such new compounds as are prepared by the reaction of ethylene sulphide or its equivalent with cyanamide and other amides, amidines and triazines which can be prepared from cyanamide. It relates especially to the preparation of mercapto-alkyl and mercapto-alkylol cyanamides.

It is an object of this invention to prepare these compounds by simple and efficient processes. A further object is to obtain them in a conveniently utilizable form. Other and further objects as well as uses for the compounds herein prepared will be found in the following description.

The objects of this invention are attained by reacting an alkylene sulphide with cyanamide, an amidine or any of the above-mentioned compounds or with an alkyl, aryl, aralkyl or acyl amine reaction product of cyanamide. Similarly, the various alkyl, aryl, alicyclic and heterocyclic derivatives of cyanamide, the amidines and triazines can likewise be reacted to obtain the corresponding mercapto compounds. These reactions may be effected with or without external heating or cooling. In place of an alkylene sulphide, a reaction product of hydrogen sulphide and epichlorhydrin or substituted epichlorhydrin may be used.

The reaction products of this invention are not necessarily pure compounds. Due to tautomerism, isomerization, polymerization, and side reactions the products herein prepared may coexist in several monomeric and polymeric forms. Thus, for example, the 2-mercaptoethyl cyanamide can exist in any one of several tautomeric forms, and the names thiolethyl cyanamide, 2-cyanamino-thioethyl alcohol, 2-imino-thiazoline, ethylene-iso-thiourea, etc., may be applied thereto to identify the compound and its isomer. However, under carefully controlled conditions, principally the simple monomeric reaction product having the following probable formula is obtained:

NCNHRSH in which R is either an alkyl, an alkoxyalkyl or a hydroxy alkyl radical, depending upon whether one or several moles of an alkylene sulphide or a hydroxy alkyl sulphide is reacted with each mole of the cyanamide metal salt or derivative.

These alkyl sulphide cyanamide condensation products are polymerizable by heat and accordingly when heated they form as an intermediate polymerization product, the respective dimers having the probable formula:

NCNHRS—SRHNCN where R is as defined above. Hence where the term alkyl or alkylene sulphide cyanamide is used hereafter both the unpolymerized compound and the dimer thereof, when present, is to be included.

The alkyl sulphide cyanamides may be condensed in accordance with the processes of this invention with a primary amine having the formula:

$R_1NH_2$ wherein $R_1$ is an alkyl radical containing at least 3 carbon atoms, an aralkyl radical or an aryl radical, to form condensation products having surface activity of the cation-active type. These products also show some accelerator activity when incorporated in rubber products. In cases where the amines of the above-defined classes form condensation products which lack adequate water solubility, such as may occur on the condensation of long chain alkyl or aralkyl amines, one or more water solubilizing groups, such as a hydroxy group, may be introduced into the molecule of the alkyl sulphide cyanamide before its condensation with such an amine.

The method of the present invention for producing condensation products having surface activity of the cation-active type comprises heating together an amine as defined above with an alkyl sulphide cyanamide in the presence of an acidic residue. While the heating of the components may be carried out in any suitable manner, it has been found that an acid should be present in the reaction mixture in order to effect condensation. Suitable acids for this purpose are hydrochloric acid, sulphuric acid, acetic acid, etc., either in the free state or in the form of its combination with an organic base to form a salt.

The new preparations find a very wide range of uses. For example, they can be applied to leather as dehairing agents. They are useful also as intermediates in the preparation of resins, some forming resinous polymerization products by simply heating the product. Still others are highly effective and cheap insecticides namely, the 2-mercaptoethyl cyanamide. Still other uses are found in the compounding of rubber and rubber containing articles where the products of this invention are found to exert favorable plasticizing and some vulcanization accelerating activity.

In order to facilitate a further understanding of the invention, the following examples are given primarily for the purpose of illustrating certain more specific details of the invention. The scope thereof is not to be deemed limited thereby except as defined in the claim.

The constitution of the new condensation products obtained in accordance with this invention cannot be indicated with certainty. The probable structural formulae for such products may be indicated as follows:

For cyanamide products:

NCNHRSH

For dicyandiamide products:

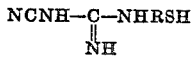
NCNH—C—NHRSH
‖
NH

For guanidine products:

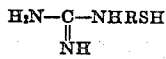
H₂N—C—NHRSH
‖
NH

For biguanide products:

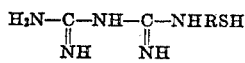
H₂N—C—NH—C—NHRSH
‖       ‖
NH     NH

For guanylurea products:

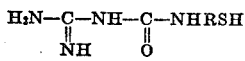
H₂N—C—NH—C—NHRSH
‖       ‖
NH      O

For melamine products:

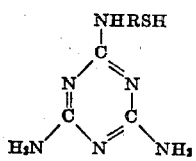

However it is also to be understood that the compounds can exist in a number of tautomeric forms, for example, for cyanamide the following are possible:

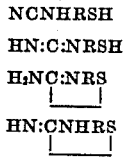
NCNHRSH
HN:C:NRSH
H₂NC:NRS
  |    |
HN:CNHRS
  |    |

*Example I*

Ethylene sulphide was prepared by any one of a number of methods. Thus 225 g. of potassium thiocyanate dissolved in 225 cc. of water was maintained at 5° to 10° C. and 150 g. of ethylene oxide was added thereto. After standing at this temperature for several hours, the ethylene sulphide formed separated out as a supernatant layer while the aqueous layer held the potassium cyanate in a partially crystallized form on the bottom. The ethylene sulphide was decanted off and distilled on a steam bath, only that portion boiling at 56° C. under atmospheric pressure being collected.

30 g. of ethylene sulphide (0.5 mol.) and 21 g. of cyanamide were added together at room temperature and shaken periodically. At first the cyanamide dissolved in the ethtylene sulphide. Later a white flocculent precipitate formed and a temperature rise to 45° C. was noted. Then a gelatinous mixture formed and on standing an additional 15 minutes yielded fine gray crystals. The reaction was completed by heating on a steam bath under reflux for one hour. The product which was yellow at first, became orange. The liquid reaction medium distilled off, leaving the product, 2-mercaptoethyl cyanamide, which was dried at 65° C. in an air drying oven and ground to a powder. It had highly satisfactory insecticidal properties.

*Example II*

Under slightly different reaction conditions different products were obtained. Thus, 30 g. of ethylene sulphide and 21 g. of cyanamide were added together and occasionally shaken in a flask for 10 minutes. The pH of the reaction mixture was approximately 8.5. After cooling to 20° C. and standing for 30 minutes under a reflux condenser, a vigorous exothermic reaction took place to yield a solid brown mass in the flask. When pulverized this also yielded a good insecticide.

*Example III*

21 g. of cyanamide was dissolved in 63 cc. of water and the solution cooled to 5° C. 30 g. of ethylene sulphide was then added and the milky solution stirred for 35 minutes, its temperature, meanwhile, rising to 23° C. The reaction was continued under reflux with constant stirring by heating on a steam bath to 30° to 35° C. for 25 minutes. A white amorphous precipitate formed and further heating to 80° C. yielded a yellow and finally an orange colored precipitate which was separated by filtration and dried. The 2-mercaptoethyl cyanamide obtained in each of these examples has valuable insecticidal properties. There products contained some polymerized ethylene sulphide as well as other polymerization products, hence the condensation products above described are not uniform in composition.

*Example IV*

Condensation products having greater water solubility than otherwise possible are prepared as follows:

78.8 g. of barium hydroxide was slurried with 300 cc. of water and cooled to 2° C. Hydrogen sulphide was then bubbled through the slurry until a saturated solution was obtained. 277.5 g. of epichlorhydrin was added slowly with constant agitation and cooling by means of an ice bath. A strong exothermic reaction occurred necessitating careful cooling. After all of the epichlorhydrin had been added hydrogen sulphide was passed into the reaction mixture for an additional 1½ hours, whereafter the ice bath was removed and CO₂ passed into the reaction mixture to precipitate all the barium as barium carbonate and simultaneously remove the excess hydrogen sulphide. Filtering the mixture and evaporating the filtrate on a steam bath under reduced pressure until no further water was given off yielded a colorless, viscous liquid, 1-chloro-3-mercapto-2-propanol.

Condensation of this product with cyanamide (60.6% NCNCa) was effected by slurrying 123 g. of cyanamide (1 mol.) and 41.6 g. of sodium hydroxide (1 mol.) in 300 cc. of water while stirring and cooling the reaction mixture with an ice-water bath. When the temperature reached 18° C., 126.5 g. of the above prepared 1-chloro-3-mercapto-2-propanol was added, the temperature rising to 25° C. in 15 minutes, and after remaining there for 5 minutes, it began to fall. The slurry was agitated for 80 minutes at 20° to 35° C. after which no further temperature rise was noted even though the ice-water bath was removed. The reaction mixture was filtered, the filtrate neutralized with hydrochloric acid and then evaporated on a shallow pan at 65° C. in an air-drying oven. The product was a pale yellow liquid containing sodium chloride and calcium chloride, which were readily separated therefrom by decanting the clear liquid. The product was soluble in water and alcohol but insoluble in chloroform, ether and benzol. It was further dehydrated by distillation under reduced pressure yielding 3-mercapto-2-hydroxypropyl cyanamide as a resinified product.

Example V 29.3 g. of 3-mercapto-2-hydroxypropyl cyanamide (0.2 mol.), 36.8 g. of dodecylamine (0.2 mol.) and 24.2 g. of glacial acetic acid were mixed at room temperature. A thick paste formed and a temperature rise to 45° C. was noted. The mixture was then stirred and heated at 70° C. for 30 minutes to yield the desired product, N'-(3-mercapto - 2 - hydroxypropyl) -N³- dodecylguanidine acetate as a light colored wax which gave clear, foaming aqueous solutions having useful properties for rubber compounding.

Example VI 29.3 g. of 3-mercapto-2-hydroxypropyl cyanamide (0.2 mol.) and 19.8 g. of cyclohexylamine (0.2 mol.) were mixed. An exothermic reaction took place, as indicated by a temperature rise to 46° C. A further increase in temperature followed the addition of 30 cc. of glacial acetic acid. Heating the reaction mixture to 96° C. yielded the desired product, N'-(3-mercapto-2-hydroxypropyl)-N³-cyclohexylguanidine as a viscous gel, readily soluble in water and sparingly soluble in benzol.

Example VII

The sequence of steps in the process according to this invention may be slightly varied as illustrated in the following condensation of cyanamide (60.6% NCNCa) with hydrogen sulphide and beta-methyl epichlorhydrin:

An aqueous slurry was prepared from 262 g. of cyanamide (2 mol.) in 500 cc. of water and agitated at 25° to 30° C. for 30 minutes. The reaction vessel was cooled with an ice-water bath and hydrogen sulphide passed through the slurry for 1½ hours until saturated. Then 213 g. of beta-methyl epichlorhydrin was added in small portions for over a period of 30 minutes, without letting the temperature of the reaction mixture exceed approximately 35° C. ± 2° while simultaneously continuing to pass hydrogen sulphide therethrough. After all the epichlorhydrin had been added, H₂S was passed into the mixture for an additional 25 minutes. 84.2 g. of sodium hydroxide dissolved in 100 cc. of water was then added over a period of about 5 minutes, the ice bath was then removed and the reaction allowed to proceed at room temperature for several hours and then filtered. The filtrate was neutralized with hydrochloric acid to a pH of 6.0. The solution changed from reddish-brown to colorless and a resinous material appeared on the surface. This was probably the dimer of the 3-mercapto-2-methyl-2-hydroxypropyl cyanamide, namely 3,3'-dicyanamino-2,2'-dihydroxydipropyl disulphide. This product was dissolved in chloroform and the aqueous and chloroform layers were separated. Evaporation of the chloroform layer yielded 45 g. of a water-insoluble resinous material. Evaporation of the aqueous solution in an air-drying oven at 50° C. yielded a pale yellow, viscous liquid containing crystalline sodium and calcium chloride. The clear liquid was decanted, the salts remaining therein separated out upon dissolving the product in denatured ethyl alcohol. Filtering this mixture and evaporating the filtrate yielded the desired product as the water soluble monomer, 3-mercapto-2-methyl-2-hydroxypropyl cyanamide.

Example VIII

Although the alkyl or alkylol sulphide condensation products have been described as prepared from cyanamide in the above examples, various other alkyl or alkylol cyanamides and substituted derivatives thereof may be used as for example:

74.6 g. of chloropropylol cyanamide (0.5 mol.) and about 27 g. of sodium disulphide (0.25 mol.) were dissolved in 80 cc. of denatured ethyl alcohol and heated under reflux on a steam bath for 9 hours. Acidifying the resulting brown solution gave the desired product 3,3'-dicyanamino-2,2'-dihydroxydipropyl disulphide.

Example IX 5 g. of biguanide (0.05 mol.) and 6 g. of ethylene sulphide (0.1 mol.) were heated under a reflux condenser on a steam bath until refluxing ceased. The desired product 2-mercaptoethyl biguanide, was obtained as a white solid material weighing 9 g. When ground to a fine powder and heated to 140° C. it decomposed with an exothermic reaction.

Example X 9.1 g. of guanyl urea in the form of the sulphate (0.027 mol.) was dissolved in 40 cc. of water by warming. 1.12 g. of sodium hydroxide was added with stirring until dissolved whereafter 150 cc. of denatured ethyl alcohol was added with stirring to precipitate the sodium sulphate. The reaction was allowed to proceed for 30 minutes while being cooled in an ice bath. This solution was filtered, and the filtrate evaporated under vacuum on a steam bath until it weighed 17.6 g. 6 g. of ethylene sulphide was added to this aqueous solution and the mixture heated on a steam bath until refluxing ceased. Filtering the solution, washing the precipitate three times with water and drying yielded 6.2 g. of the desired product 2-mercaptoethyl guanyl urea.

Example XI 9 g. of quanidine carbonate (0.05 mol.) were dissolved in 100 cc. of denatured ethyl alcohol containing 5.8 cc. of sulphuric acid, (0.1 mol.). 8.4 g. of sodium hydroxide (0.2 mol) dissolved in 25 cc. of water was added and the precipitate of sodium sulphate formed was separated by filtration. The filtrate was evaporated to 20 cc. on a steam bath under vacuum. 6 g. of ethylene sulphide was added to this aqueous solution, the reaction mixture refluxed for 3 hours and dried at 90° C. to yield 11.4 g. of the desired product 2-mercaptoethyl guanidine.

In a manner similar to the above examples, cyanamide and amidines which can be prepared from cyanamide such as dicyandiamide, substituted guanidine and triazines such as melamine, guanamine, ammeline, and the like, may be reacted with alkyl and alkylol sulphides. These reaction products may then be further reacted with primary and secondary amines as above explained to yield products having surface active properties and according to the extent and nature of their surface activities, may be used as emulsifying agents, wetting agents, demulsifiers, or they may find use in the formulation of inks and rubber latex emulsions, as plasticizers, accelerators, emulsifiers for resins and waxes, as softeners for leather and leather assistants such as dehairing aids and the like.

It is to be understood that the scope of this invention is not to be limited by the examples specifically contained herein illustrating specific embodiments of the invention since many modifications and various combining weights of the reacting ingredients may be used, but that it is to be construed broadly and restricted solely by the scope of the appended claim.

We claim:

A condensation product of ethylene sulphide and cyanamide.

LEONARD PATRICK MOORE.
WALTER P. ERICKS.